United States Patent [19]  
Liebert

[11] 4,221,159  
[45] Sep. 9, 1980

[54] PRESSURE MEDIUM CONTROL DEVICE FOR HYDROSTATIC STEERING SYSTEMS OF MOTOR VEHICLES

[75] Inventor: Karl-Heinz Liebert, Schwaebisch Gmund, Fed. Rep. of Germany

[73] Assignee: Zahnradfabrik Friedrichshafen AG., Friedrichshafen, Fed. Rep. of Germany

[21] Appl. No.: 957,287

[22] Filed: Nov. 2, 1978

[51] Int. Cl.³ .................................... F15B 11/08
[52] U.S. Cl. ............................. 91/467; 60/384
[58] Field of Search .................. 91/467, 469, 470; 60/384, 386; 137/596, 596.13, 625.14, 625.24

[56] References Cited
U.S. PATENT DOCUMENTS 3,385,057  5/1968  Pruvot et al. ................... 60/384
3,528,521  9/1970  Ellis ............................. 91/467
4,033,377  7/1977  Johnson .......................... 137/596
4,174,612  11/1979  Liebert ........................... 60/384

FOREIGN PATENT DOCUMENTS
1151446  7/1963  Fed. Rep. of Germany.

Primary Examiner—Leonard D. Christian  
Attorney, Agent, or Firm—Zalkind & Shuster

[57] ABSTRACT

A control valve assembly having relatively displaceable valve elements through which control passages establish fluid flow paths to a steering servomotor for supply of metered fluid to the pressurized side of the servomotor and exhaust of fluid from the contracting side to an internal low pressure space in the valve assembly. The control passages in the valve elements are protectively located between supply passages under full pump pressure to prevent loss of fluid as a result of leakage from the control passages.

5 Claims, 4 Drawing Figures

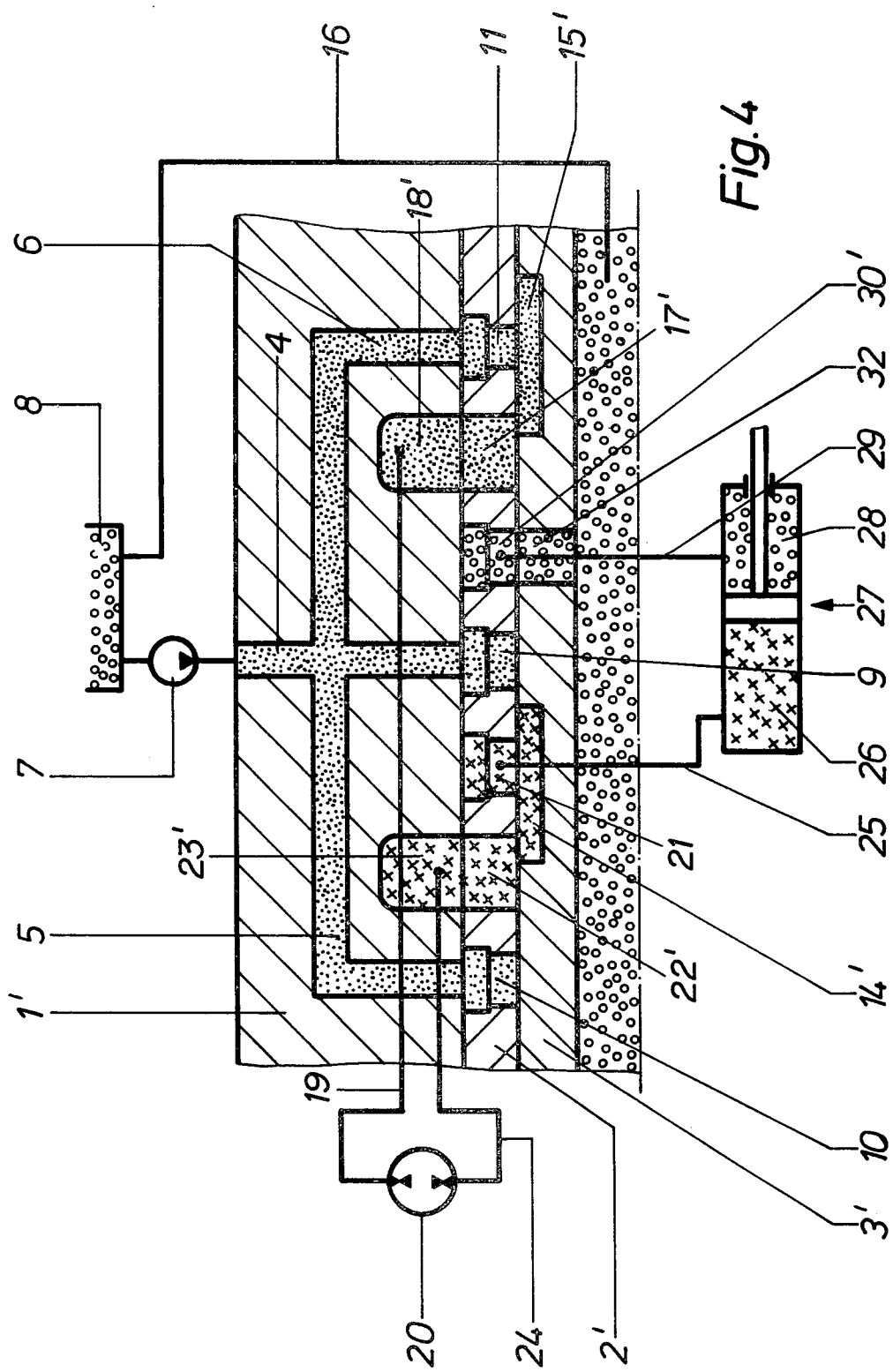

PRESSURE MEDIUM CONTROL DEVICE FOR HYDROSTATIC STEERING SYSTEMS OF MOTOR VEHICLES

BACKGROUND OF THE INVENTION

This invention relates to a pressure control device particularly adapted for hydrostatic steering systems of motor vehicles.

A pressure control system is disclosed in German patent No. AS 1151446 wherein an annular control passage in a radially outer valve element of a control valve assembly receives the discharge of a pressure medium from the exhausting chamber of a servomotor to conduct the pressure medium to a reservoir tank through a radially inner space enclosed by the valve elements. In such control valve assembly, a low pressure zone exists in the aforesaid annular control passage of the radially outer valve element located between two additional end passages in the outer valve element. The two additional end passages are respectively connected to the outlet end of a metering pump connected to the hand operated steering wheel and the pressurized side of the servomotor, and are hydraulically interconnected through longitudinal grooves in a radially inner valve element when the two valve elements are properly adjusted relative to each other. The flow path so established conducts the pressure medium under a high pressure to the pressurized side of the servomotor. Inasmuch as the low pressure passage in the outer valve element is enclosed between two high pressure end passages in accordance with the foregoing arrangement, a predetermined pressure balance will develop between the aforementioned control passages affected by unavoidable leakage from the two end passages to the intermediate low pressure control passage. Such unavoidable leakage originates from locations in the pressure control system at which any pressure loss directly results in faulty adjustment by the servomotor. Specifically, the loss of pressure medium from the system depletes the supply of pressure medium to the pressurized side of the servomotor from the metering pump. Such decrease in the flow of metered pressure medium to the servomotor results in a corresponding reduction in servomotor adjustment of the steering gear. Further, one of the end passages in the radially outer valve element aforementioned, conducting the pressure medium to the metering pump for metered supply of pressure medium to the pressurized side of the servomotor, is located a relatively short distance from the externally exposed side of the valve elements. Since the internal space of the control valve assembly is connected to the reservoir tank and therefore has the lowest pressure of the system, an unavoidable loss of pressure medium occurring at the externally exposed valve surface results in an additional loss of pressure medium from the internal space of the control valve assembly and a loss of pressure medium from the exhausting side of the servomotor. All of the foregoing losses of pressure medium contributes to a considerable amount of imprecise servomotor adjustment which may be traced back to the unavoidable leakage aforementioned.

It is therefore an important object of the present invention to reduce and substantially eliminate the adverse influence of unavoidable leakage on the operation of the servomotor in a hydrostatic steering system of the type aforementioned.

SUMMARY OF THE INVENTION

In accordance with the present invention, a pressure control valve assembly is provided wherein the unavoidable leakage of pressure medium occurs at locations that are acted upon by passages to which the pressure medium is directly supplied from the high pressure source of the system. In such case, the loss of pressure medium will have no detrimental effect since the high pressure source is in a position to make up any loss of pressure medium occurring as a result of leakage. Further, those control passages associated with the control valve assembly of the present invention connected with the pressurized side of the servomotor, are so located that they will always be spaced a substantial distance from each other regardless of the relative positioning of the valve elements as well as being sufficiently spaced from those zones connected to the reservoir tank through the internal space of the control valve assembly.

The present invention solves the problem associated with prior art arrangements aforementioned in a unique manner involving an arrangement in which a pair of control passages connected to the metering pump of the steering system and the servomotor are enclosed by supply passages which are directly connected to the high pressure pump source. As a result, the pair of control passages are protectively screened so that pressure medium escaping as a result of leakage from the flow path to the pressurized side of the servomotor, communicates with a passage under full pressure before such leakage could reach a low pressure zone in the control valve assembly. This protective screening of leakage enclosing the aforementioned pair of control passages, is effectively accomplished by location of one of said pair of the control passages intermediate supply passages connected to the high pressure pump source closing off the system at both ends adjacent the externally exposed surfaces of the control valve assembly. As a result, the aforementioned pair of control passages always lie between an intermediate and two end passages under full pressure of the high pressure pump source.

The aforementioned pair of control passages connected to the metering pump and servomotor, in the control valve assembly of the present invention, are arranged in one embodiment so as to reduce the number of passage conduits ordinarily required for supply and discharge of pressure medium to and from the metering displacement pump of the steering system. This is accomplished by placing the supply and discharge passages to the metering pump on opposite sides of the passage connected to a low pressure region in fluid communication with the reservoir through the internal space of the control valve assembly. A reversal of such passage locations may of course be utilized if desired.

BRIEF DESCRIPTION OF THE DRAWING FIGURES

In the drawings, two embodiments of the invention have been shown wherein:

FIG. 4 is a partial section view and schematic diagram showing a modification of the arrangement shown in FIG. 2.

DETAILED DESCRIPTION OF PREFERRED EMBODIMENTS

Figure 1:
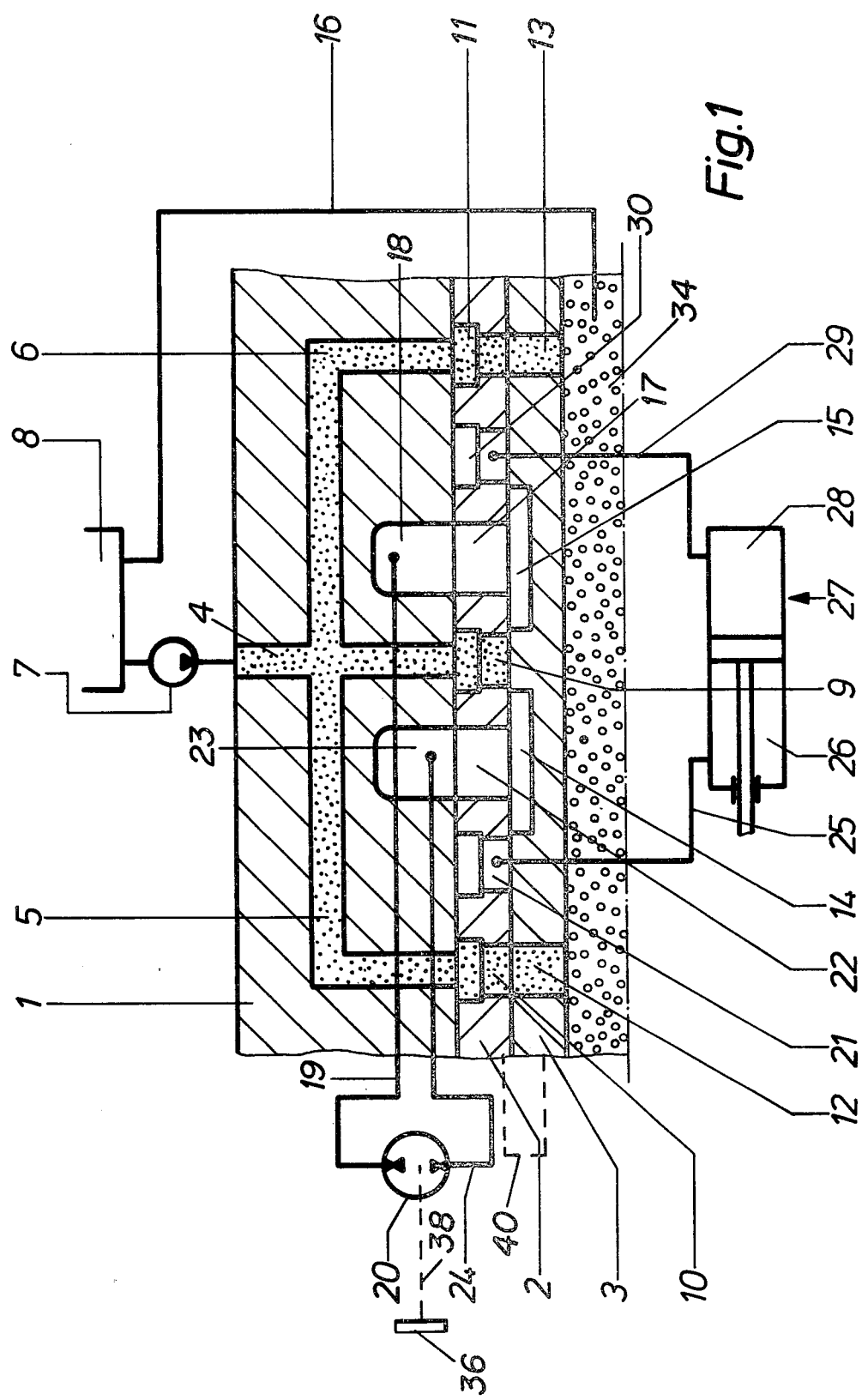
FIG. 1 is a longitudinal section view on one side of the longitudinal axis through a control valve assembly constructed in accordance with the present invention in association with other components of a hydrostatic steering system schematically illustrated.

Referring now to the drawings in detail, FIG. 1 illustrates a pressure control valve assembly shown in a neutral position from which it is displaceable against the bias of a return spring arrangement well known in the art. The pressure control valve assembly includes tubular valve body or housing 1 within which is mounted a radially outer valve element 2 and a radially inner valve element 3. The housing 1, and valve elements 2 and 3 are concentric tubular members shown in partial longitudinal section in FIG. 1 on one side of a longitudinal axis. An inlet conduit 4 is formed in the housing 1 having branches 5 and 6. The inlet conduit is connected to a source of high pressure in the form of pump 7 receiving its pressure medium from a reservoir tank 8. The outer valve element 2 is mounted within the housing 1 in such a manner well known in the art to provide the maximum possible fluid sealing. The outer valve element 2 has an internal surface in slide bearing relation to valve element 3 with facilities providing the maximum possible mutual fluid sealing. The valve element 3 is axially displaceable in either axial direction from the neutral position shown.

The three housing conduit portions 4, 5 and 6 are respectively in fluid communication with supply passage means including conduits 9, 10 and 11 formed in the outer valve element 2. The latter supply conduits are formed by radial bores extending from radially outer, annular channel portions receiving fluid from the inlet conduits 4, 5 and 6. In the embodiment shown in FIG. 1, the outer valve element 2 is axially fixed in relation to the housing 1 but is angularly displaceable relative thereto without interrupting the supply of pressure medium from the inlet conduits 4, 5 and 6 to the supply conduits 9, 10 and 11.

The inner valve element 3 slidably mounted within the valve element 2 is provided with radial bores 12 and 13 in fluid communication with a radially inner internal space 34 of the control valve assembly to which the reservoir 8 is hydraulically connected by means of connecting line 16. The supply passage means also includes annular grooves 14 and 15 formed in the inner valve element 3. In the neutral position of the valve elements as shown in FIG. 1, the inlet conduits 4, 5 and 6 are connected by the supply passage conduits 10 and 11 to the radial bores 12 and 13 establishing fluid communication to the internal space 34 from which the pressure medium is conveyed by line 16 to the reservoir tank 8. The pressure medium is therefore conducted from the high pressure pump 7 through a short circuit connection established from the inlet conduits 4, 5 and 6 through supply conduits 10 and 11 and radial bores 12 and 13 to the reservoir 8. The other passages in the control valve assembly shown in FIG. 1 are inactive in the neutral position shown.

Figure 2:
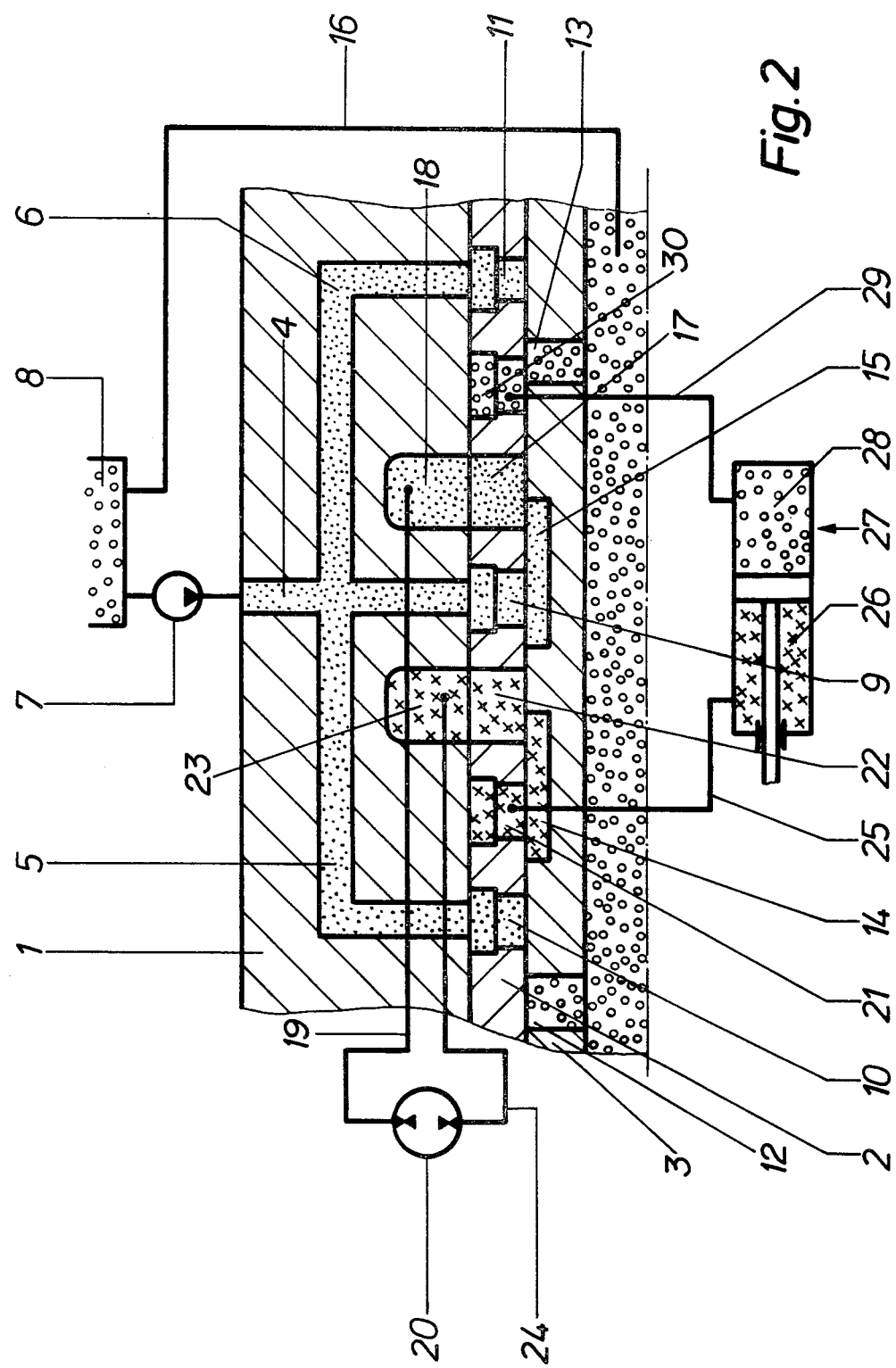
FIG. 2 is a partial section view and schematic diagram as in FIG. 1, but showing the control valve assembly in one end position displaced from the neutral position shown in FIG. 1.

When the control valve assembly is displaced to an end position as shown in FIG. 2, the inner valve element 3 is shifted to the left by comparison with the neutral position shown in FIG. 1. In this end position, the radial bores 12 and 13 are no longer aligned with the supply passage conduits 10 and 11 which are thereby shut off to maintain the inlet conduits 5 and 6 under static pressure. The inlet conduit 9 shut off in the neutral position shown in FIG. 1, is now in fluid communication with the annular passage groove 15 formed in the inner valve element 3 to establish fluid communication between the supply conduit 9 and a control passage conduit 17 formed in the outer valve element 2. A plurality of radial bores in the valve element 2 forming the control conduit 17 directly communicate with an annular chamber 18 formed in the housing 1 to which line 19 is connected extending from the inlet side of a metering displacement pump 20. Accordingly, pressurized operating medium is fed from the high pressure pump 7 to the metering pump 20 which has a driving connection 36 to a hand operated steering wheel 38 in a manner well known in the art. The inner valve element 3 also is provided with a second annular groove passage 14 which establishes fluid communication between a pair of control passage conduits 21 and 22 in the valve element 2. The two control conduits 21 and 22 formed by a plurality of radial bores in the outer valve element 2, are thereby hydraulically interconnected in order to establish fluid communication between the outlet side of metering pump 20 and a pressurized chamber 26 of a servomotor 27 through connecting lines 24 and 25. Thus, a hydraulic connection is established for pressurized fluid medium from the annular chamber 18 in the housing through connecting lines 19 to the metering pump 20, from the pump 20 through connecting line 24 to the annular chamber 23 in the housing and finally through the annular passage 14 to the control conduit 21 from which the pressurized fluid is conducted by connecting line 25 to the pressure chamber 26 of the servomotor. The foregoing flow path will supply a metered flow of pressurized fluid to the servomotor causing displacement thereof in response to rotation of the hand steering wheel 36 drivingly connected to the metering pump 20. A corresponding quantity of fluid is displaced from the exhausting chamber 28 of the servomotor and conducted to the reservoir 8 along a flow path also established by shift of the valve element 3 to the end position shown in FIG. 2, which flow path is formed by a connecting line 29 from the chamber 28 to the control conduit 30 in the valve element 2 from which the pressure fluid is discharged through radial bores 13 in valve element 3 into the internal space 34.

Axial shift of the inner valve element 3 to the end position shown in FIG. 2, is effected in a manner well known in the art in response to turning of the hand steering wheel 36 to which the metering pump 20 is connected by the driving connection 36. Under the action of the metering displacement pump 20, the outer valve element 2 is angularly displaced in relation to the inner valve element 3 causing axial shift of the inner valve element back to its neutral position as shown in FIG. 1. Mechanism 40 for effecting such return axial shift of the inner valve element 3 in response to turning of the hand steering wheel, is well known as disclosed for example in German Pat. No. 1,550,557.

It should be appreciated that the present invention also contemplates relative displacement between the valve elements in an angular direction in which case longitudinal grooves are utilized in order to establish fluid communication between the passages in the outer valve element instead of annular grooves.

Figure 3:
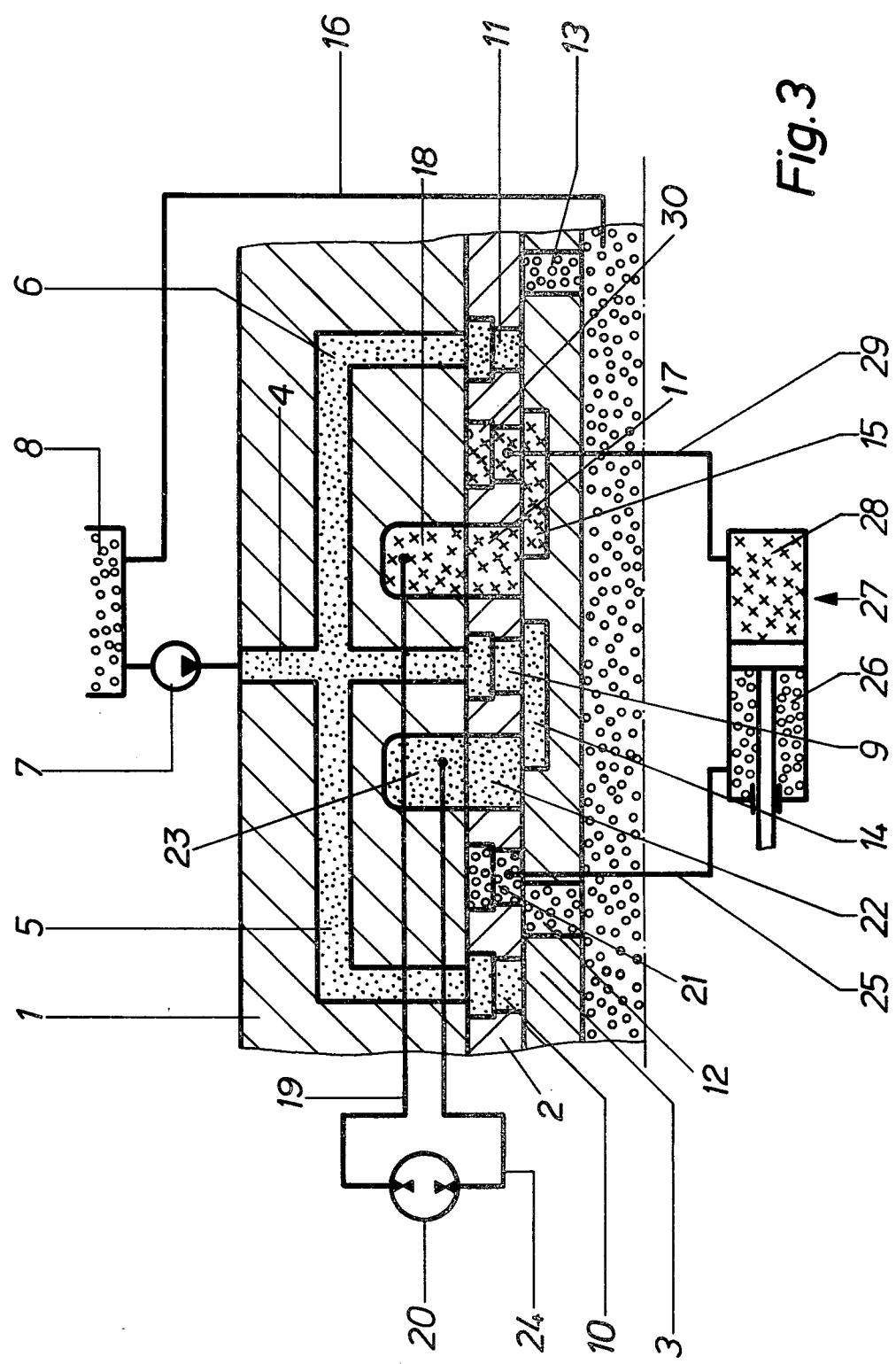
FIG. 3 is a section view and schematic diagram as in FIGS. 1 and 2, showing the control valve assembly in the other end position.

FIG. 3 illustrates the control valve assembly in the other end position wherein the metering displacement pump 20 acts on the fluid in a reverse direction so that the annular chamber 23 connected to the pump 20 by line 24 receives pressurized fluid from the high pressure source while metered fluid is delivered from the pump 20 by connecting line 19 to the annular chamber 18 from which the metered fluid is conducted through annular groove 15 and connecting line 29 to the right-hand pressurized chamber 28 of the servomotor 27. The control action of the pressure control valve assembly as illustrated in FIG. 3 is directionally reversed from that shown in FIG. 2.

As a result of the arrangement illustrated in FIGS. 2 and 3, it will be apparent that the pair control passage conduits 21 and 22 in the valve elements 2 or the pair of control passage conduits 17 and 30 are always connected to the outlet side of the metering displacement pump 20 and are always axially located between supply passage conduits 10 and 15 or 11 and 14 under full pressure. Thus, the control passage conduits connected to the outlet of the metering pump 20 are protected by supply passages under full pressure whereby there is little tendency for loss of fluid as a result of leaks. This is especially true inasmuch as the conduit connected to the outlet of the metering pump 20 is remote from the passages connected to the exhausting side of the servomotor 27. The aforementioned protective arrangement also has the effect of preventing loss of fluid from passages connected to the outlet of the metering pump 20 through externally exposed portions of the valve elements (not shown) since a passage under full pressure will always be located between the control passages and the closest external valve surface. The system described will accordingly provide optimum protection against adverse effects of unavoidable leaks.

In the embodiment illustrated in FIGS. 1–3, the control passages 17 and 22 connected to the metering pump 20 are protected against leakage by supply passages under full pressure with the control passages 21 and 30 connected to the servomotor 27, disposed on opposite sides of the control passages 17 and 22 from the supply passage 9. This locational arrangement is reversed in the embodiment illustrated in FIG. 4 showing the inner valve element 3' in the right-hand end position corresponding to that of FIG. 3. In FIG. 4, the same reference numerals are utilized to label parts as shown in FIGS. 1–3 except for relocated or modified parts having labels modified by a prime ('). Like numbered parts perform the same functions. Thus, the annular groove passages 14' and 15' interconnect the control passages 17' and 22' with the supply passages 10' and 11'. The supply passage conduit 9 is shut off in both end positions of the control valve assembly and is connected through a single control passage 32 in the inner valve element 3' to the internal space 34 in the neutral position of the control valve assembly. The single control passage 32 replaces the two axially spaced passage bores 12 and 13 as shown in FIGS. 1–3. The leakage protective effect on the control passages connected to the outlet of the metering pump 20 is, however, provided for in the embodiment illustrated in FIG. 4 as in the case of the embodiment illustrated in FIGS. 1–3.

What is claimed is:

1. In combination with a hydrostatic steering system or the like having a high pressure source (7), manually operated metering means (20), a servomotor (27) and a reservoir (8) for a pressure medium; a pressure control device, comprising a housing (1), a radially outer valve element (2) mounted in said housing, a radially inner valve element (3) slidably mounted within and axially displaceable relative to said outer valve element against a return bias from a neutral position in which a short circuit connection (10-12, 11-13) is established between the high pressure source and the reservoir, control passage means (21, 30) in the outer valve element and the inner valve element for establishing fluid communication between said metering means and the servomotor in response to displacement of the inner valve element from said neutral position, and supply passage means (9, 10, 11, 14 and 15) mounted by the valve elements in leakage protective enclosing relation to the control passage means for supplying the pressure medium from the high pressure source to both the metering means and the short circuit connection.

2. The combination of claim 1 wherein said supply passage means includes two spaced end conduits (10, 11) in the outer valve element, and an intermediate conduit (15) located between the two end conduits.

3. The combination of claim 2 wherein the supply passage means further includes a pair of conduits (22, 17) for supply and discharge of the pressure medium to the metering means on opposite sides of the intermediate conduit.

4. The combination of claim 2 wherein the control passage means is located on opposite sides of the intermediate conduit.

5. In a steering system having a servomotor (27), a source (7) of pressurized operating medium, a manually operated metering device (20) and a control valve assembly connected to the metering device and the servomotor for establishing a flow path for the operating medium from the source to the servomotor through the metering device in response to operation of the metering device, said control valve assembly including control passage means (21, 30) for conducting said pressurized medium to the metering device and metered medium from the metering device to the servomotor, and supply passage means (9, 10, 11, 14, 15) mounted in enclosing relation to the control passage means for conducting the pressurized medium from the source under full pressure to the control passage means and receiving all leakage flow therefrom.

* * * * *